F. L. BROUSSOUSE AND P. J. LEBOUCHER.
ELASTIC SUSPENSION FOR VEHICLES AND OTHER BODIES IN MOTION.
APPLICATION FILED FEB. 17, 1920.
1,427,060.　　　　　　　　　　　Patented Aug. 22, 1922.
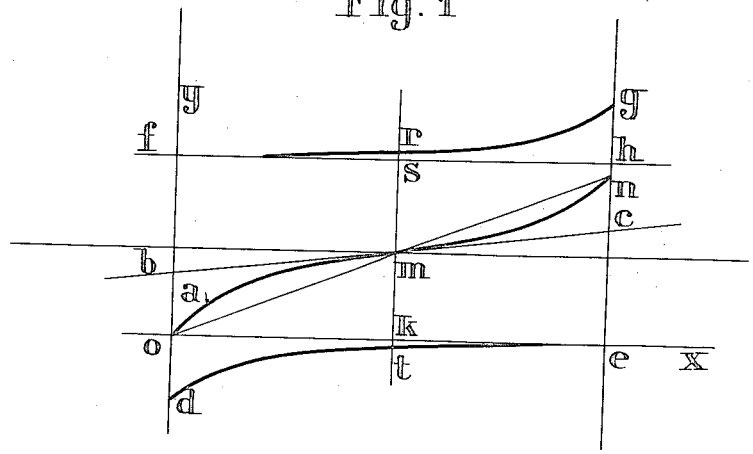
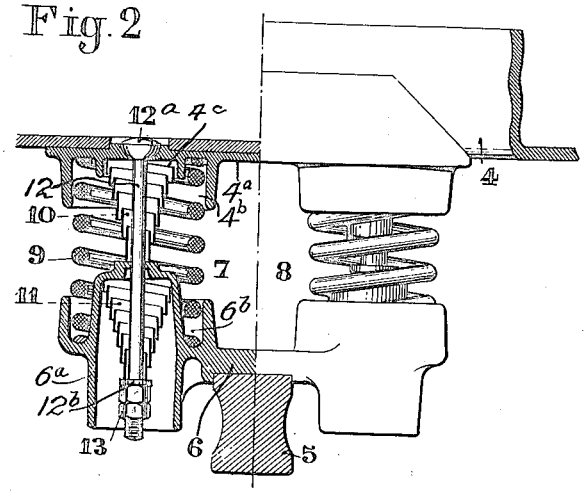
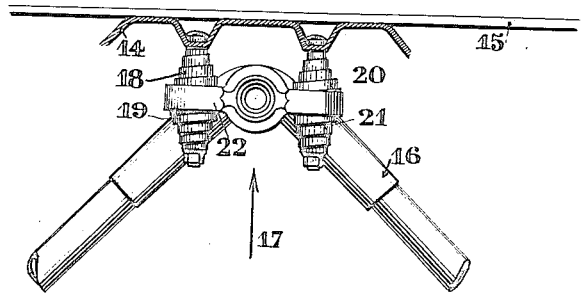
INVENTORS
FERNAND LOUIS BROUSSOUSE,
PAUL JULES LEBOUCHER.
BY
ATTORNEYS.

UNITED STATES PATENT OFFICE.

FERNAND LOUIS BROUSSOUSE AND PAUL JULES LEBOUCHER, OF PARIS, FRANCE.

ELASTIC SUSPENSION FOR VEHICLES AND OTHER BODIES IN MOTION.

1,427,060.   Specification of Letters Patent.   Patented Aug. 22, 1922.

Application filed February 17, 1920. Serial No. 359,287.

*To all whom it may concern:*

Be it known that we, FERNAND LOUIS BROUSSOUSE, a citizen of the French Republic, residing at Rue Sainte Anne, Paris, France, and PAUL JULES LEBOUCHER, a citizen of the French Republic, residing at 19 Rue Theodore de Banville, Paris, France, have invented certain new and useful Improvements in and Relating to an Elastic Suspension for Vehicles and Other Bodies in Motion, of which the following is a specification.

The invention relates to elastic suspension devices for vehicles or other moving bodies, and has for its object to provide an elastic suspension device of novel construction and possessing the following advantages:—

Great stability of the body in motion, easiness of rolling or gliding, and consequently a less variation of strain at the point of contact of suspension.

Said results are obtained by a combination of springs or equivalent elastic systems, arranged in order to obtain a great flexibility in the middle part of the suspension and a flexibility decreasing in a progressive and continued manner in proportion as one is displacing in one direction or the other away from that middle part.

In the accompanying drawings which show, by way of example, constructional forms of the invention:

Figure 1 is a diagram of the graphical representation of the operation of the elastic suspension forming the subject of the present invention.

Figures 2 and 3 show by way of example, two examples which practically embody the device.

In the diagram of Figure 1, the displacements are indicated by $(OX)$, and the corresponding loads or strains by $(Oy)$. The total amplitude of flexion is $(Oe)$.

As the origin $O$, that is to say without any external load or strain, and consequently without any resulting deflection for the whole, a main spring with a constant flexibility, the characteristic of which is $(bc)$ is balanced by an opposing spring with decreasing flexibility the characteristic of which is $(ed)$.

Then: $Ob = Od$.

A second spring with decreasing flexibility $(fg)$ is arranged in the direction of $(bc)$ without any strain at $(Oy)$ and in such a manner that:

$$kt = rs$$
$$en = ec + hg.$$

The result is that the sum of the ordinates of each spring constitutes a particular continued curve of flexibility, shown at $a$, which gives to the whole elastic system the following special properties.

$a$.—A dynamic capacity nearly equal to that of a single spring with constant flexibility, the supposed characteristic of which $(On)$ would have the same extreme points as the curve $a$.

$b$.—On both sides of the middle position of load or strain $m$, the flexibility progressively decreases and in a continued manner with the amplitude of displacement.

Those properties provide the suspension with the above mentioned advantages.

A practical embodiment for the suspension of a vehicle is shown in Figure 2.

Referring to said figure: The frame 4 rests on the axle 5 through a stirrup 6 carrying two similar elastic means 7, 8, each having the characteristics and properties corresponding to the diagram of Figure 1.

Since both means are alike it will suffice to describe one. Secured to the underside of the frame 4 is a member $4^a$ having two concentric annular flange forming seats $4^b$ and $4^c$. The stirrup 6 is provided with a tubular member $6^a$ open at the bottom and provided with an aperture in its top. The tubular member projects above and below the stirrup and the part above the stirrup is surrounded by an annular flange on the upper face of the stirrup and forming a seat $6^b$. The main spring 9 rests in the seats $4^b$ and $6^b$ and the opposing spring 10 rests upon the tubular member $6^a$ and in the seat $4^c$. A bolt 12 has its head $12^a$ swiveled in the member $6^a$ and extends through the springs 9 and 10 into the tubular member $6^a$ and is provided with nuts 13 thereon. On the bolt within the tubular member $6^a$ is a washer $12^b$ and upon the bolt between the washer and the closed end of the tubular member is mounted the other opposing spring 11. The springs 10 and 11 are each formed of a strip of steel trapezoidal in shape and rolled up to make a volute spring, the coils of which are of different lengths.

The frame 4 oscillates, in relation to the axle 5, according to a curve of flexibility similar to the curve $a$ (Fig. 1) and the amplitude of displacements is limited, on the one hand by the complete compression of the spring 10, and on the other hand, by the complete compression of the spring 11.

Another arrangement designed for pantographs supplying electric current from aerial lines is shown in Figure 3.

On that figure, the rubber 14 has to collect electric current from the line 15, which are approximately straight and horizontal, and which offers "hard points" irregularly distributed.

The said rubber is carried by an articulated parallelogram 16 having the main elastic system, a spring or compressed air, not shown on the drawing, but the vertical action of which takes place in the direction of arrow 17, with the required pressure for the convenient passage of current at the point of contact.

Opposing springs with progressive flexibility 18—19, 20—21, connect the rubber to the parallelogram 16 through a side lever 22.

It is, besides, quite evident that those embodiments have been given only by way of example, and that the invention is applicable to the elastic suspension of any body in motion.

What we claim is:

1. In a suspension device, the combination with a frame, of a stirrup supported at its center below the frame and having an apertured tubular member at each end, and a spring device between the frame and each end of the stirrup each spring device including two volute springs, the coils of which are of different heights, one spring being arranged with its base in engagement with the frame and its apex in engagement with the tubular member of the stirrup and the other in the said tubular member with its base in engagement therewith, and a bolt carried by the frame and extending through the springs and the tubular member and provided with a nut on its lower end.

2. In a suspension device, the combination with a frame, an axle and a member on the axle, of a spring device between the member and the frame on each side of the axle, each spring device having a main spring and two opposed auxiliary volute springs, the coils of which are of different heights, the main spring and one auxiliary being between the member and frame and the other below the member and connected with the frame.

3. In a suspension device, the combination with a frame and a member carried by the axle of a main spring between the frame and member, an auxiliary spring within the main spring between the frame and member, the auxiliary spring being formed of a steel strip trapezoidal in shape and rolled up to form a volute spring, the coils of which are of different heights, a swiveled bolt carried by the frame and extending through the said member and provided with a nut, and a second auxiliary spring between the member and the nut of the bolt.

4. In a suspension device, the combination of a frame having concentric seats on its under side, a stirrup carried by the axle and provided with a tubular member open at the bottom and having an aperture in the top and with an annular seat on its upper face, a main spring seated in a seat of the frame and the seat of the stirrup, an auxiliary volute spring seated in a seat in the frame and resting on the tubular member, a swiveled bolt carried by the frame and extending into the tubular member and provided with a nut, and a second auxiliary volute spring in the tubular member between the closed end thereof and the nut of the bolt, the coils of the volute springs being of different heights.

In testimony whereof we have hereunto set our hands at Paris (France), this 29 day of January, 1920.

FERNAND LOUIS BROUSSOUSE.
PAUL JULES LEBOUCHER.